United States Patent [19]
Marsden

[11] Patent Number: 5,500,093
[45] Date of Patent: Mar. 19, 1996

[54] OIL PURIFICATION

[76] Inventor: Alan Marsden, 272 NW. 79th Ter., Margate, Fla. 33063

[21] Appl. No.: 98,360
[22] PCT Filed: May 10, 1993
[86] PCT No.: PCT/US93/04533
  § 371 Date: Aug. 9, 1993
  § 102(e) Date: Aug. 9, 1993
[87] PCT Pub. No.: WO93/23507
  PCT Pub. Date: Nov. 25, 1993

Related U.S. Application Data

[63] Continuation-in-part of Ser. No. 11,954, Feb. 1, 1993, abandoned, which is a continuation-in-part of Ser. No. 954,573, Sep. 30, 1992, abandoned, which is a continuation-in-part of Ser. No. 882,676, May 14, 1992, abandoned.

[51] Int. Cl.$^6$ ................................................ C10G 19/073
[52] U.S. Cl. .................... 196/46; 196/46.1; 210/168; 210/206; 184/6.24
[58] Field of Search .................... 210/168, 206, 210/209, DIG. 17; 208/179, 189, 208 M; 184/6.24; 123/196 A; 196/46.1, 46; 422/222, 240, 211; 204/286, 297 R; 411/901

[56] References Cited

U.S. PATENT DOCUMENTS

| | | | |
|---|---|---|---|
| 2,884,133 | 4/1959 | Walulik et al. | 210/DIG. 17 |
| 2,983,384 | 5/1961 | Winslow | 210/223 |
| 3,279,607 | 10/1966 | Michaelson | 210/223 |
| 3,645,402 | 2/1972 | Alexander et al. | 210/266 |
| 4,014,794 | 3/1977 | Lewis | 210/206 |
| 4,417,855 | 11/1983 | Jepson | 416/244 A |

Primary Examiner—Matthew O. Savage
Attorney, Agent, or Firm—Joseph Zallen

[57] ABSTRACT

A lubricating oil purifying device adapted to be installed in the flow line of lubricating oil passing into an oil filter, comprising a solid body made of acid-reactive material and having a central orifice in which a coupling ring is positioned.

4 Claims, 9 Drawing Sheets

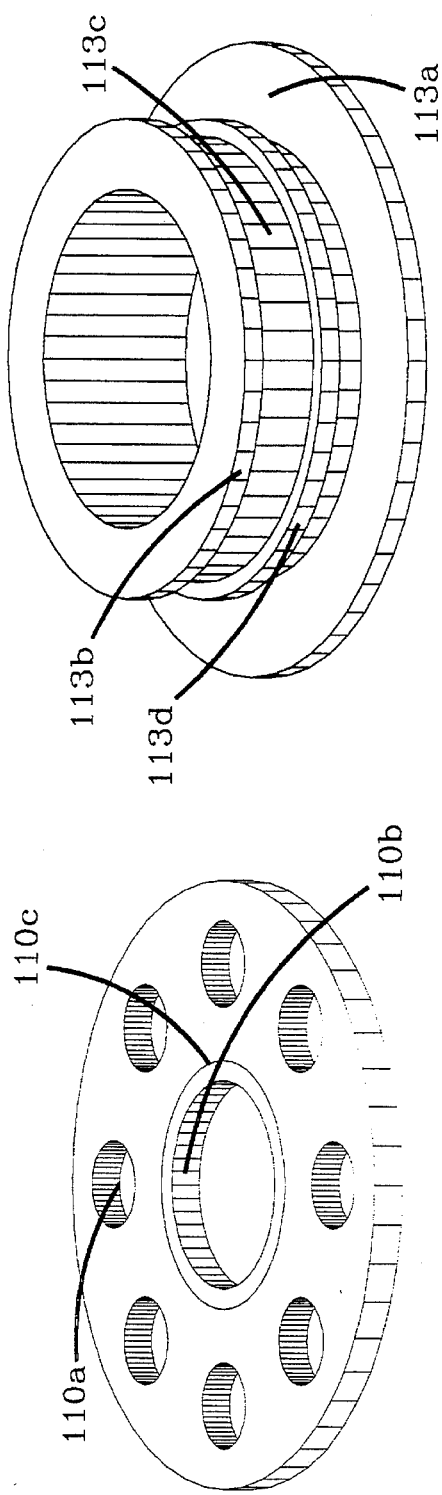
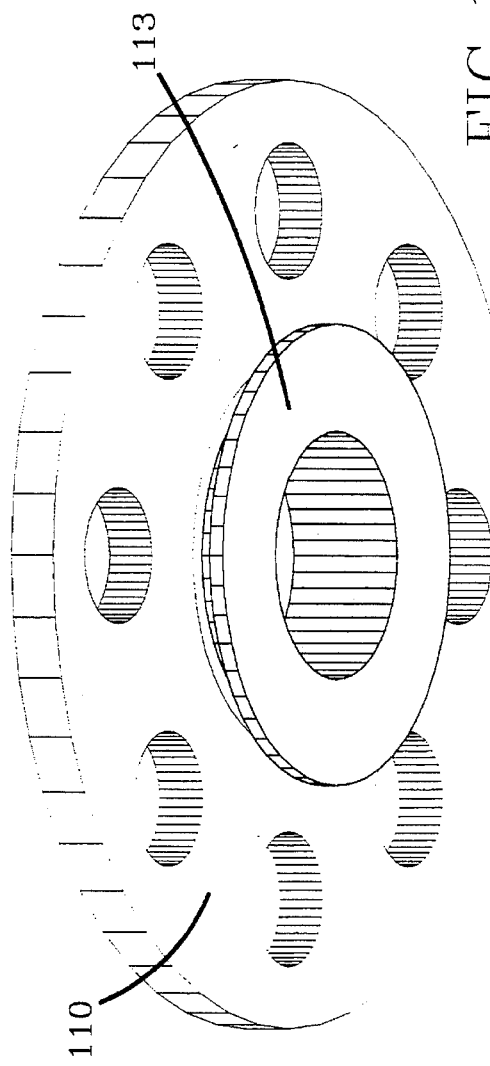
FIG. 11
FIG. 12
FIG. 10

OIL PURIFICATION

This is a continuation-in-part of pending U.S. patent application Ser. No. 08/011,954 filed Feb. 1, 1993, now abandoned, which in turn is a continuation-in-part of Ser. No. 07/954,573 filed Sep. 30, 1992, now abandoned, which in turn is a continuation-in-part of U.S. patent application Ser. No. 07/882,676 filed May 14, 1992, now abandoned. All of these applications are incorporated herein by reference.

BACKGROUND OF INVENTION

This invention relates to the purification of lubricating oils made from fossil fuels and used in internal combustion engines.

The lubrication systems of engines are required for the proper operation of the various parts of an engine such as drive shafts, piston rings, lifters, camshafts, bearings, and the like. However, because of intense heat, lubricating oil impurities, fuel impurities and air impurities, lubricating systems require constant filtration. The most common form of such filtration is to have the lubricating oil pumped through an oil filter for filtering and return to the engine. Most oil filters have inert filtering materials which remove most particulate matter, but are generally ineffective against acidic impurities such as sulfur dioxide and sulfuric acid. Acidic impurities are corrosive and tend over a period of time to damage the working parts of an engine. Accordingly, lubricating oils must be frequently changed and the discarded oils abandoned.

Methods have been proposed in the past for removing acidic impurities from lubricating oil, as indicated in the following United States patents:

U.S. Pat. No. 3,154,488 describes a device for regenerating oxidized mineral oils, comprising a pair of thin magnesium metal plates or wires, as for example, magnesium and silver wires contacting at one point only.

U.S. Pat. No. 3,617,580 describes the circulation of engine lubricating oil through oil-insoluble particles of two or more metallic elements which provide an oxidation-reduction potential.

U.S. Pat. No. 3,279,607, describes an oil filter cartridge which includes non-ferrous metallic substances, as for example, magnesium in the form of bars or stripes spaced within the normal filter materials.

U.S. Pat. No. 4,501,660 describe an oil filter whose central core contains a magnetized metallic helix enclosing longitudinal bars of magnesium metal.

However, the prior art is complex and costly.

One object of the present invention is to provide a more inexpensive means for readily and efficiently removing acidic. impurities from a lubricating oil.

Other objects and advantages of this invention will be apparent from the description and claims which follow taken together with the appended drawings.

SUMMARY OF THE INVENTION

This invention comprises broadly removing acidic impurities from liquids such as lubricating oil, by passing the oil over a solid reactive body made of acid-reactive material such as magnesium, wherein the body has a central opening so that the body can be attached to a pipe or rod. It is preferred that attachment be made by a coupling ring.

One form of the invention comprises a body in the form of a disc, which preferably has perforations. In one form of this embodiment the disc is attached by a coupling ring to the conventional oil filter support pipe of a conventional vehicle oil filter. The oil passes over the disc and through the holes, reacts with the material of the disc and washes the resultant particulate compounds into the oil filter where they are retained. The use of such reactive discs enhances the operating life of the vehicle engine. Preferred acid-reactive materials for use in this invention are those which are essentially magnesium, including pure magnesium and magnesium alloys.

Another embodiment of this invention comprises a system in which there is a single direction flow of oil. The reactive body is held in position by a coupling ring or a solid coupling rod. After the oil flows over the reactive body, it then enters a filter in which the resultant particulate compounds from reaction of the oil with the body are retained.

In another embodiment of this invention a free-standing dual flow system is provided for incorporation into a liquid delivery system which does not have a filter within its system.

Still another embodiment of this invention is adapted for cathodic protection of large ships where sea water is pumped through the pipes, comprises large surface-reactive bodies such as pleated sheets or star-shaped billets inserted into the pipes. The resultant particulate matter is retained by a subsequent filter.

It is preferred that the reactive body be separate from the particulate retaining filter so that either the particulate filter or the reactive body can be separately replaced.

The coupling ring is made of materials which are typically different materials and are not acid-reactive. Some materials can act also as catalysts. The coupling ring material should be strong and resistant to high temperatures, as for example stainless steel and high temperature resistant plastic. The coupling ring can be composed of different layers, as for example an outer layer of copper or copper alloy abutting the acid-reactive body and an inner layer of Teflon in contact with the pipe or rod. Notches may be provided in the Teflon layer to make removal of the body easier.

SPECIFIC EXAMPLES OF INVENTION

Figure 1:
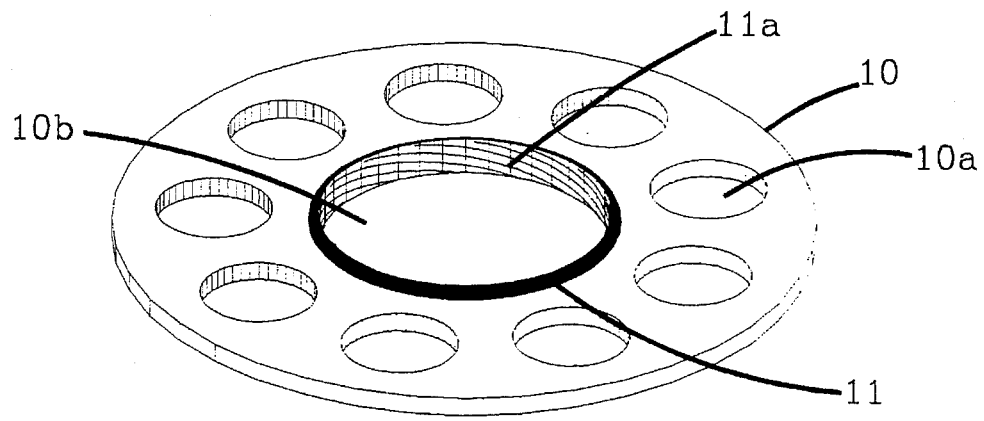
FIG. 1 illustrates a perspective view of a disc made in accordance with this invention.
Figure 2:
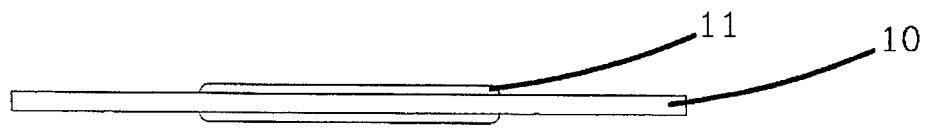
FIG. 2 is a side view of the disc.
Figure 3:
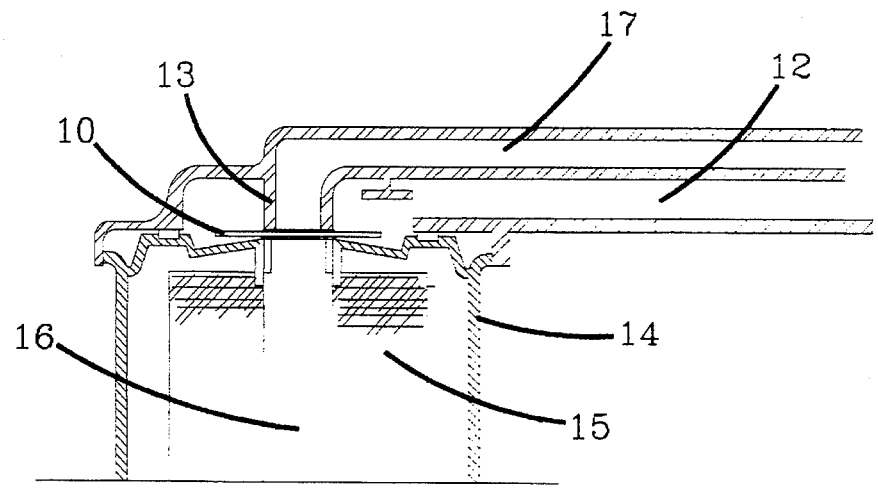
FIG. 3 is a diagrammatic view showing the position of the disc in the flow of the lubricating oil in and out of an oil filter.

Example 1:

Referring now to FIGS. 1–3 in the drawings, a magnesium alloy disc 10 of approximately 95% magnesium is shown having a plurality of large openings 10a and a central opening 10b. The illustrated disc is about two inches in diameter and one-sixteenth inch in thickness.

Attached to the central opening 10b of the disc is a stainless steel coupling ring 11 having threading 11a. The coupling ring extends out from both ends of the central opening 10b.

The disc 10 is threadably attached by its coupling ring 11 to the conventional threaded oil filter support pipe 13. The support pipe 13 holds the oil filter housing 14 in which the oil filter 15 is spaced against the crankcase with gasket 14a. The lubricating oil is continuously pumped from the engine through conduit 12 where it enters the oil filter housing chamber 14, soaks through the oil filter 15 and is returned through outlet line 16 to the lubricating oil return line 17. As the lubricating oil is pumped from conduit 12 into oil filter chamber 14, it passes over the edge and through the holes in the disc 10 with the result that the acidic impurities react with the magnesium to form particulate compounds that are washed into the oil filter 15 and retained therein.

Example 2:

A test was conducted on a Toyota 1989 pickup, six-cylinder, 4-wheel drive vehicle as follows: The vehicle was operated using standard no-lead 87 octane gasoline and was lubricated periodically with 10W30 Mobil HD Grade Lubricating Oil. The oil and oil filter were changed. The initial pH of the new oil was 6.1. At a 3000 mileage reading later, a sample of the oil was taken. This sample of oil was found to have a pH of 4.2.

At a later time, the oil and oil filter in the vehicle were again changed. The initial pH of the new oil was again 6.1. A disc made in accordance with Example 1 was attached by its coupling ring to the oil filter support pipe of the vehicle. The vehicle was then run another 3000 miles and a sample of the lubricating oil taken. This sample had a pH of 6.2.

Figure 4:
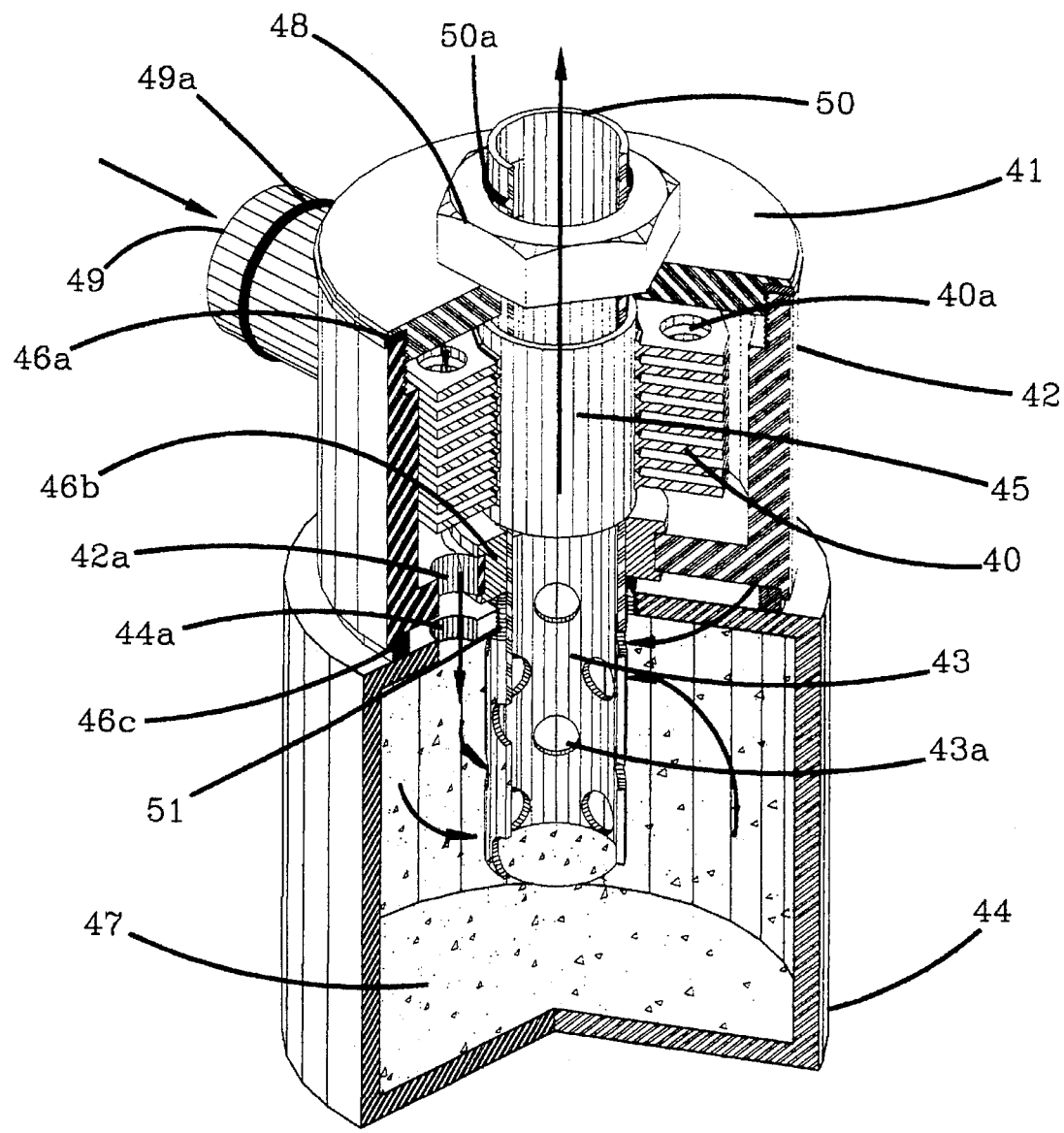
FIG. 4 is a perspective view with partial cutaway of a free-standing device made in accordance with this invention which can be used in conjunction with a pipeline, showing an array of perforated discs attached to a single collar.

Example 3:

The embodiment illustrated in FIG. 4 is an assembly which can stand alone. The base 44 incorporates particulate filter material 47 which engages the upper unit 42 by means of gasket 46c. The incoming flow is into pipe 49 through a sliphose (not illustrated) which abuts rib 49a. As oil enters the chamber of upper unit 42, it encounters and passes through an array of solid discs 40 having orifices 40a, through bottom. perforations 42a, top perforations 44a, into the particulate filter material 47 of the base 44. The array of discs 40 have central openings with a coupling collar 45 within said openings. The cover 41 of the upper unit 42 is threaded onto unit 42 by means of a hex nut 48 fused to the cover 41. The cover 41 and nut 48 hold the outlet pipe 50 which has a lower portion 43 with orifice 43a and passes through coupling collar 45 to which it is attached. Gaskets 46a, 46b, 46c, and 51 are provided. Outlet pipe 50 is connected by a sliphose (not illustrated) and is engageable with the rib 50a. Unit 44 can be a conventional type disposable filter.

Figure 5:
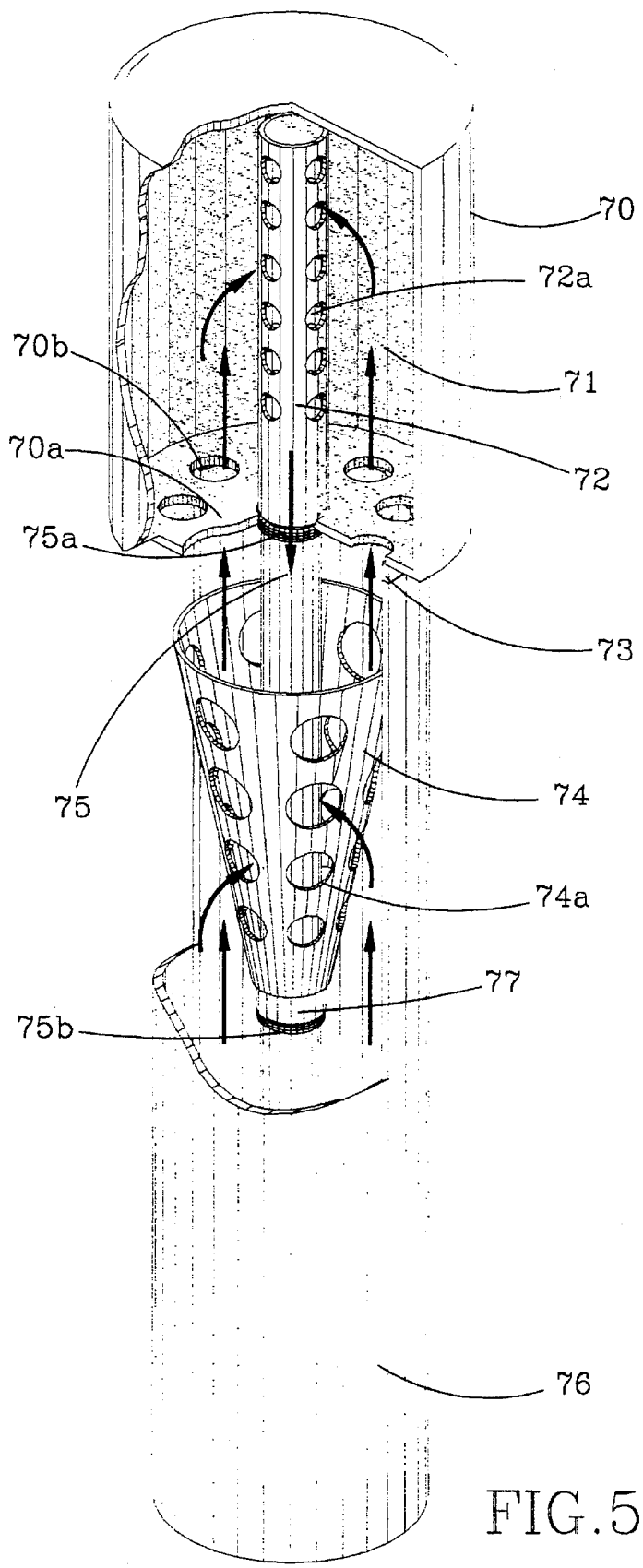
FIG. 5 illustrates a device wherein a perforated conical reactive body is attached to a coupling ring which threads onto a return pipe.

Example 4:

The embodiment illustrated in FIG. 5 comprises an upper disposable filter case 70 containing particulate filter material 71. Unit 70 has a central tube 72 with perforations 72a and a bottom wall 70a having orifices 70b.

The bottom unit 76 has a pipe 75 which is engageable with upper pipe 72, a conical shell 74 made of acid-reactive material, having orifices 74a and a central opening with a coupling collar 77 attached to threading 75b on pipe 75.

The flow of oil is up from the chamber in bottom unit 76 over and through the acid-reactive conical surface 74 and its orifice, then through wall orifice 70b into filter material 71 where it then proceeds back through orifice 72a.

Figure 6:
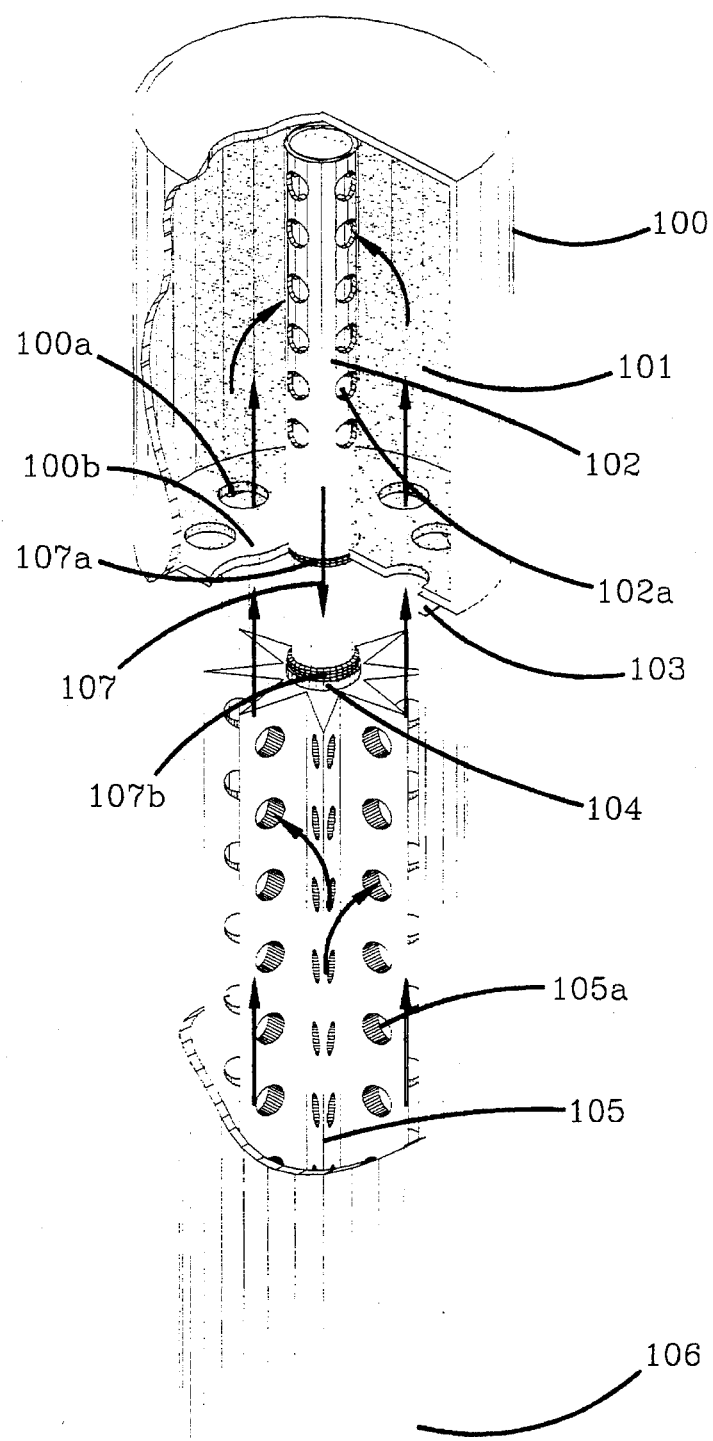
FIG. 6 illustrates a pleated perforated reactive body similar in position to FIG. 5.

Example 5:

The embodiment illustrated in FIG. 6 comprises an upper disposable filter casing 100 containing particulate filter material 101. Casing 100 has a number of orifices 100a spaced in the bottom wall 100b of the casing 100. Attached to the bottom wall is the upper outlet tube 102 having orifices 102a. The upper casing with its tube is threaded on to lower outlet tube 107 by threading 107a. Outlet tube 107 is spaced in lower casing 106 and is connected by threading 107b to a coupling collar 104. Collar 104 serves to hold fluted member 105, made of acid-reactive material and having orifices 105a.

The dirty engine oil is pumped up through the lower casing 106 where it reacts with the surface of the fluted reactive member 105 and its orifices 105a. It then passes up through the bottom wall orifices 100a in the upper chamber 100. At this point the particulate matter is filtered out by filter material 101, and the filtered and reacted oil is then returned through the orifices 102a into the upper outlet tube 102 which connects with the lower outlet tube 107.

Example 6

Figure 7:
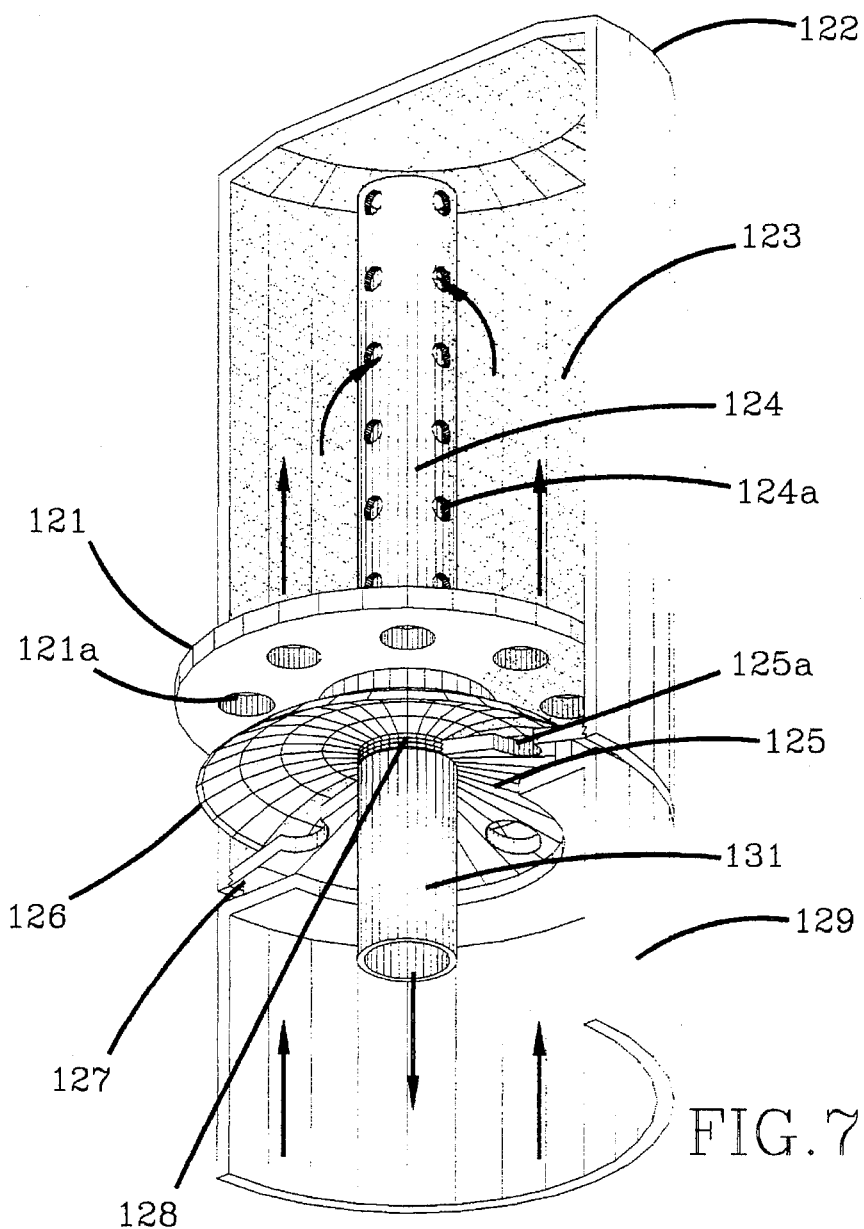
FIG. 7 illustrates a system wherein a combination of reactive disc and particulate filter are interchangeable as a unit.
Figure 7A:
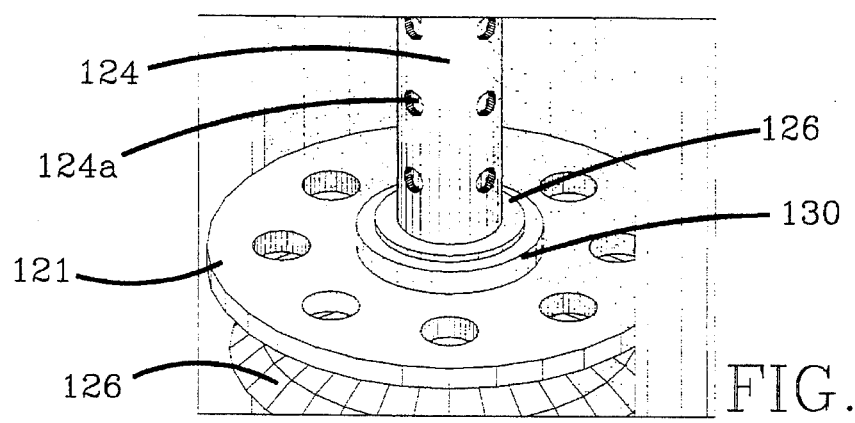

The embodiment illustrated in FIGS. 7 and 7A describes a system wherein an upper disposable filter chamber can be exchanged for another such chamber without interfering with the flow of oil under pressure. The device comprises an upper casing 122 containing particulate filter material 123, a return pipe 124 having orifices 124a to which is attached a coupling ring 130 which supports acid-reactive disc 121 having orifices 121a. Lower casing 129 holds lower return pipe 131 by means of a sealing diaphragm, 126 so arranged that when removal of the upper casing 122 disconnects it from the lower casing 129, the diaphragm 126 closes the opening over the end of return tube 131.

Figure 8:
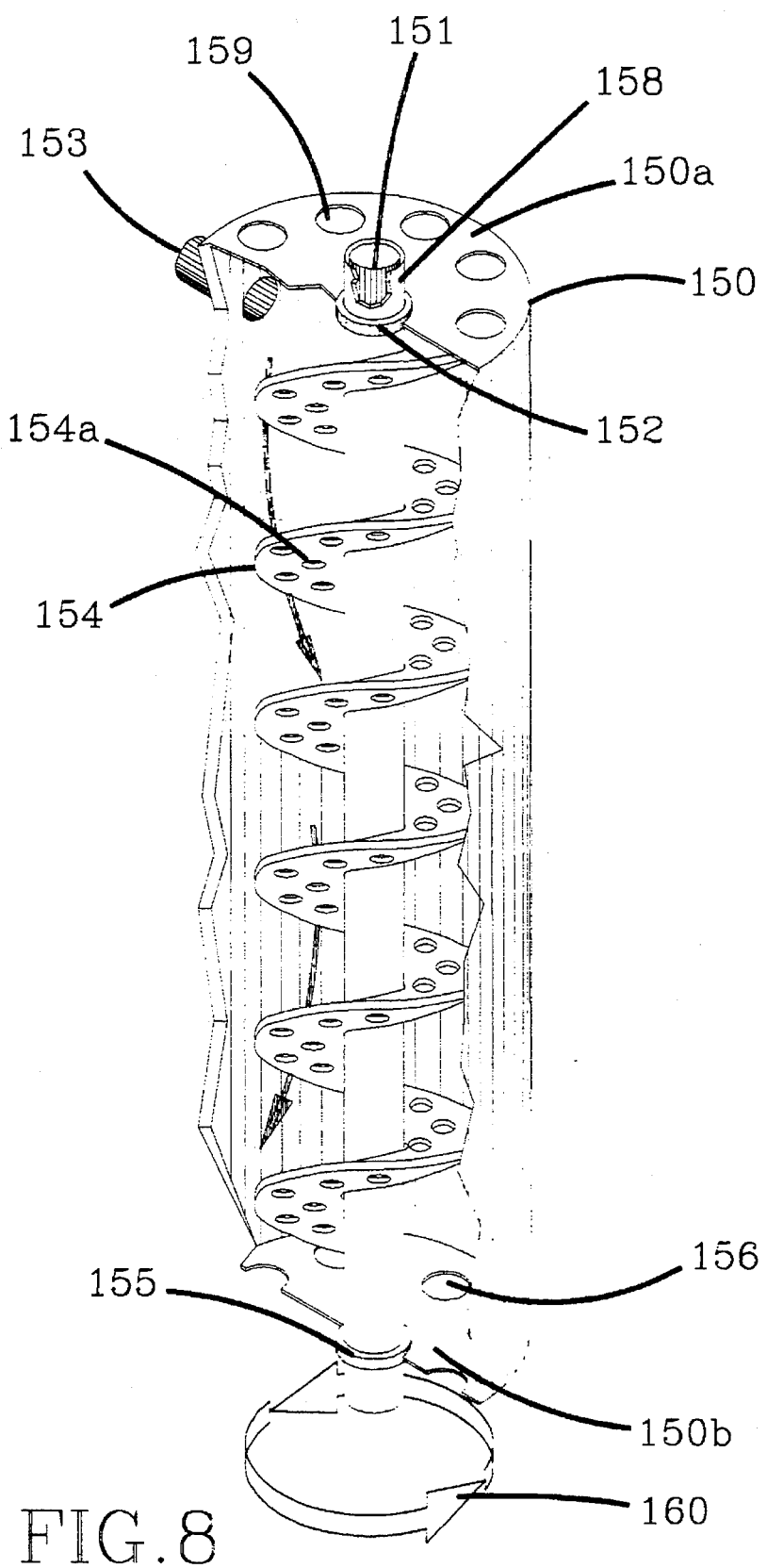
FIG. 8 illustrates a device for use with a sludge crushing system for recovery of oil.

Example 7:

The embodiment illustrated in FIG. 8 describes an oil separator which breaks up sludge granules and separates the fluid oil. The sludge from an oil filter crusher is fed through inlet orifice 159 in the top wall 150a of the casing 150. The flow delivery pipe (not illustrated) surrounds the upper wall 150a so that the flow is downward. Below the bottom wall 150b of the casing 150 is a collection container for a motor (not illustrated). Extending between the top and bottom on bearings 152 and 155 is shaft 158. A spiral blade 154 is wrapped around and attached to the shaft, and is made of acid-reactive material such as magnesium. The spiral blade 154 has perforations 154a. The rotation of the blade causes the sludge to break up while the fluid oil reacts with the blade to help remove impurities. The resultant product exits through outlet orifices 156 into the collection container (not illustrated). Any gas, for example hydrogen, which is formed by the reaction of oil and sludge with the blade, is liberated through outlet vent 153.

Figure 9:
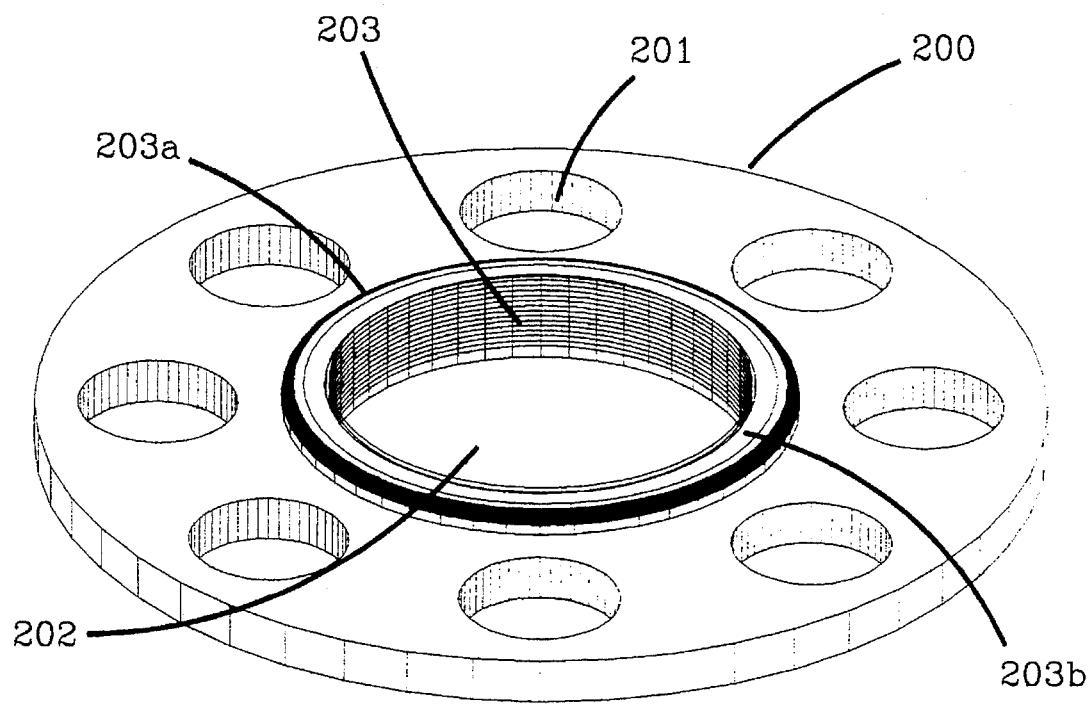
FIG. 9 is a plan view of an acid-reactive disc wherein the coupling ring is composed of two layers of material.

Example 8:

The embodiment illustrated in FIG. 9 comprises a magnesium alloy disc 200 approximately 95% magnesium. It has a plurality of large openings 201 and a central opening 202, similar in size and shape to that described in FIGS. 1–3.

Attached to the central opening 202 is a composite coupling ring 203 comprising an outer layer of copper 203a in contact with the disc 200 and an inner layer of Teflon 203b provided with threading 204 for attachment to the conventional threaded oil filter support pipe.

Figure 13:
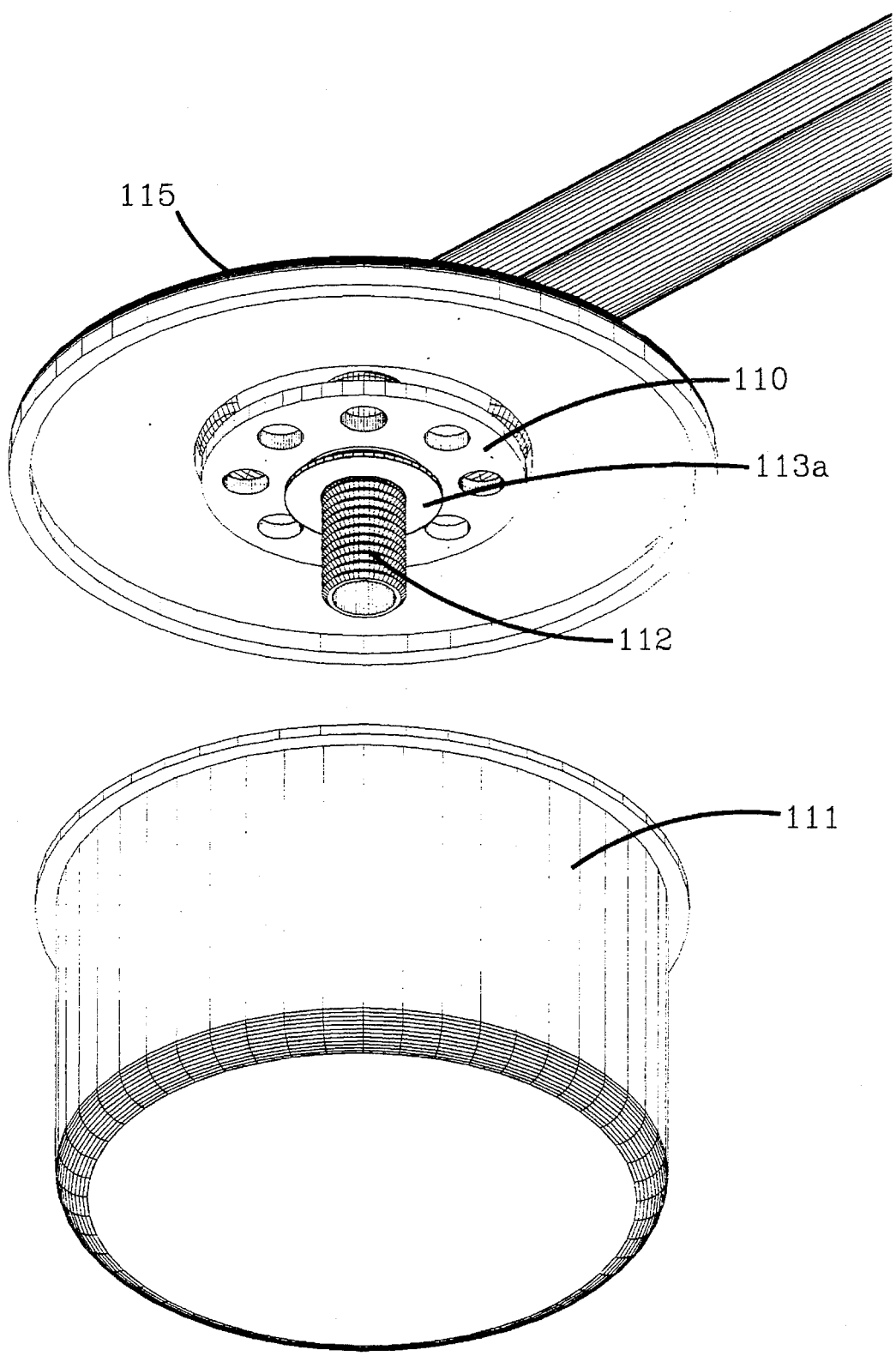
FIG. 13 is an exploded view illustrating the relationship of the invention to a conventional oil filter.
Figure 1:
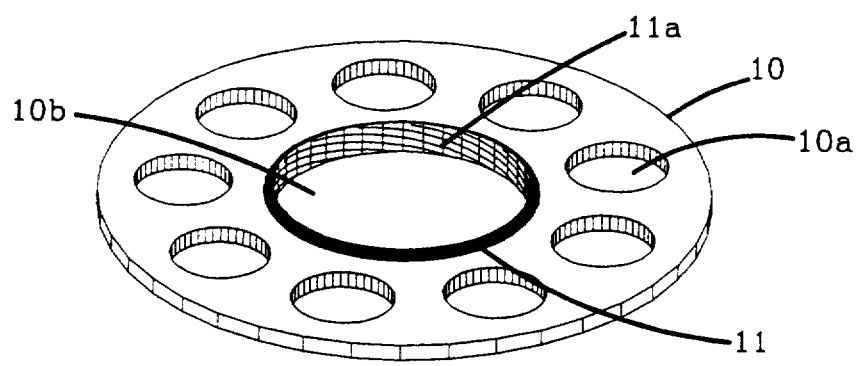
Figure 2:
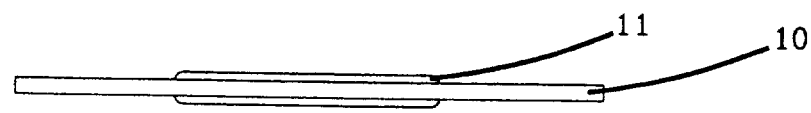
Figure 3:
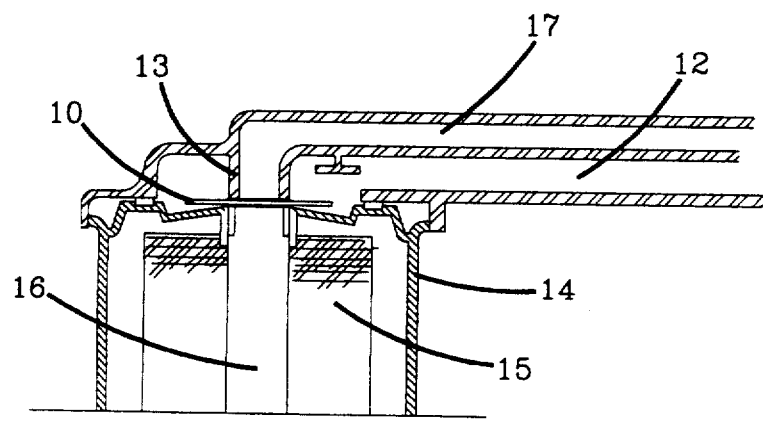
Figure 4:
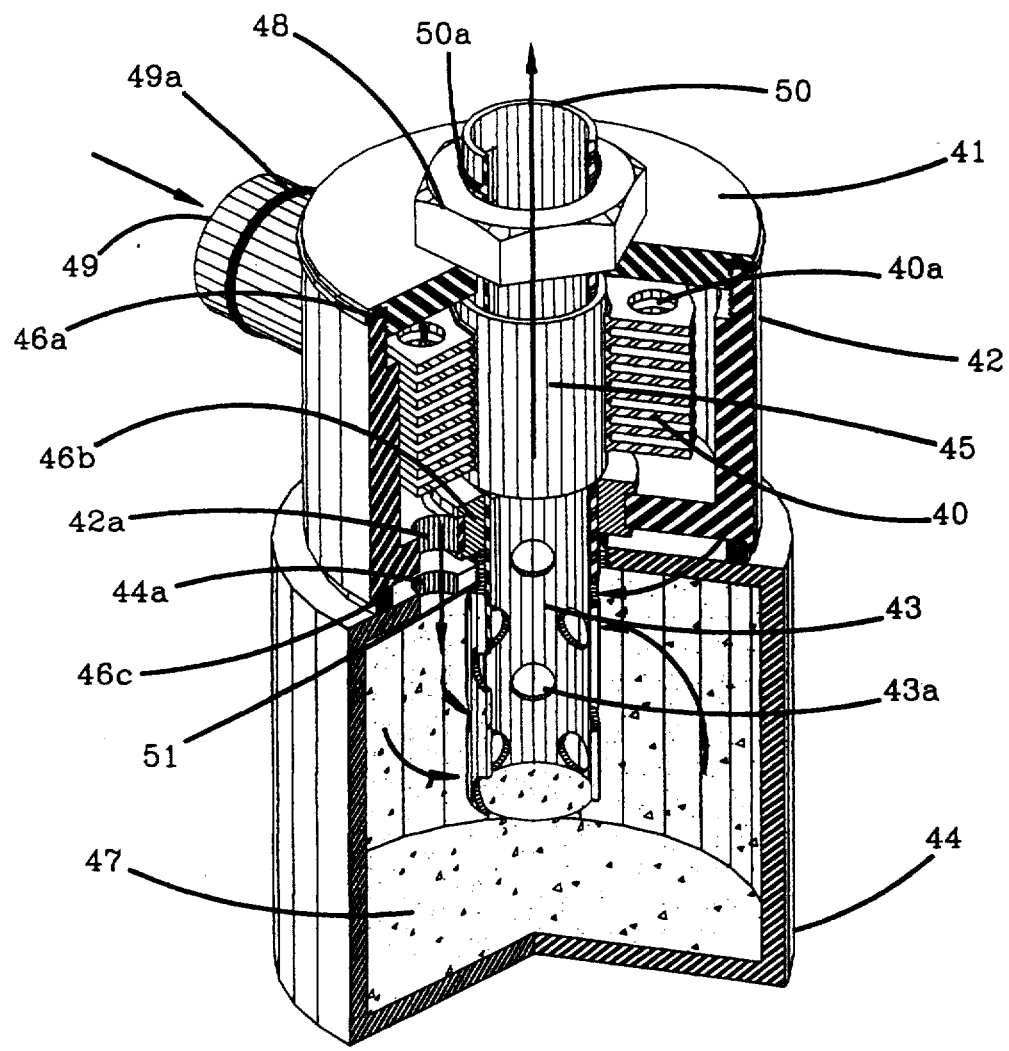
Figure 5:
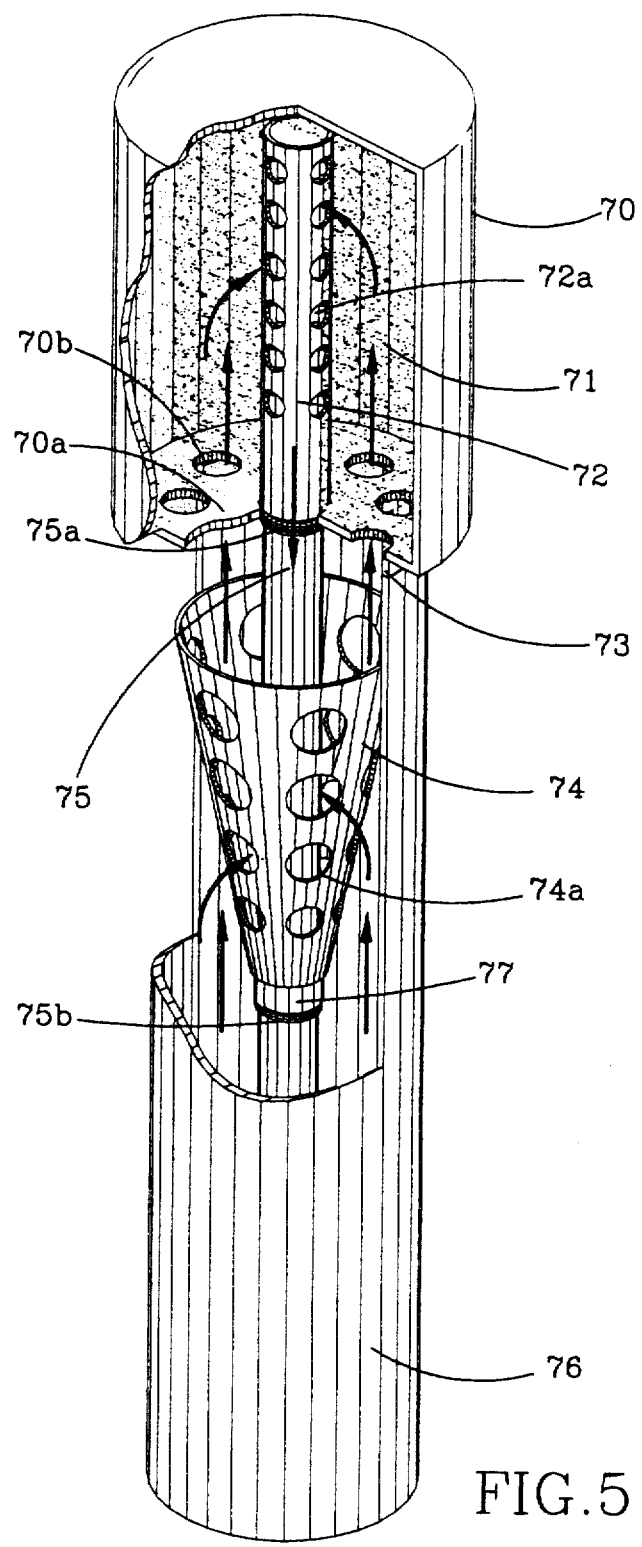
Figure 6:
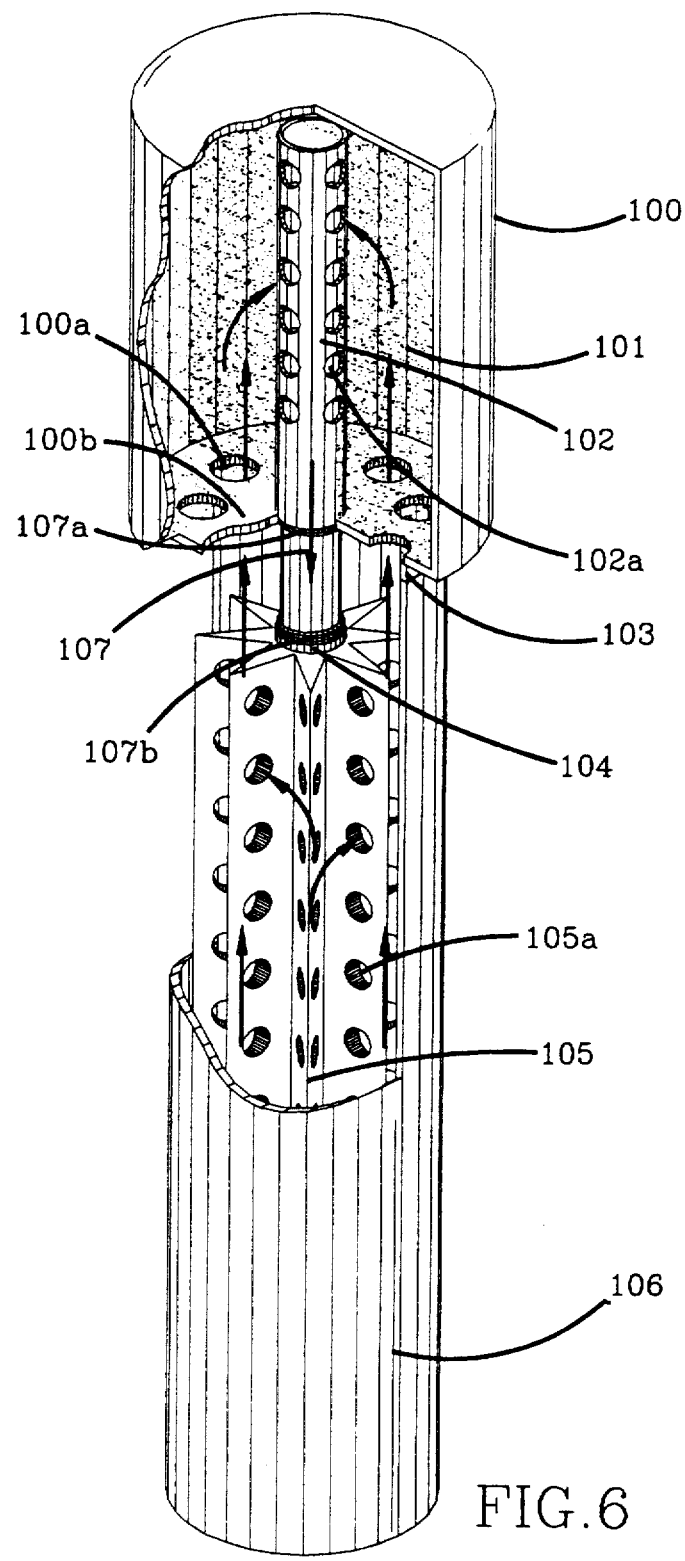
Figure 7:
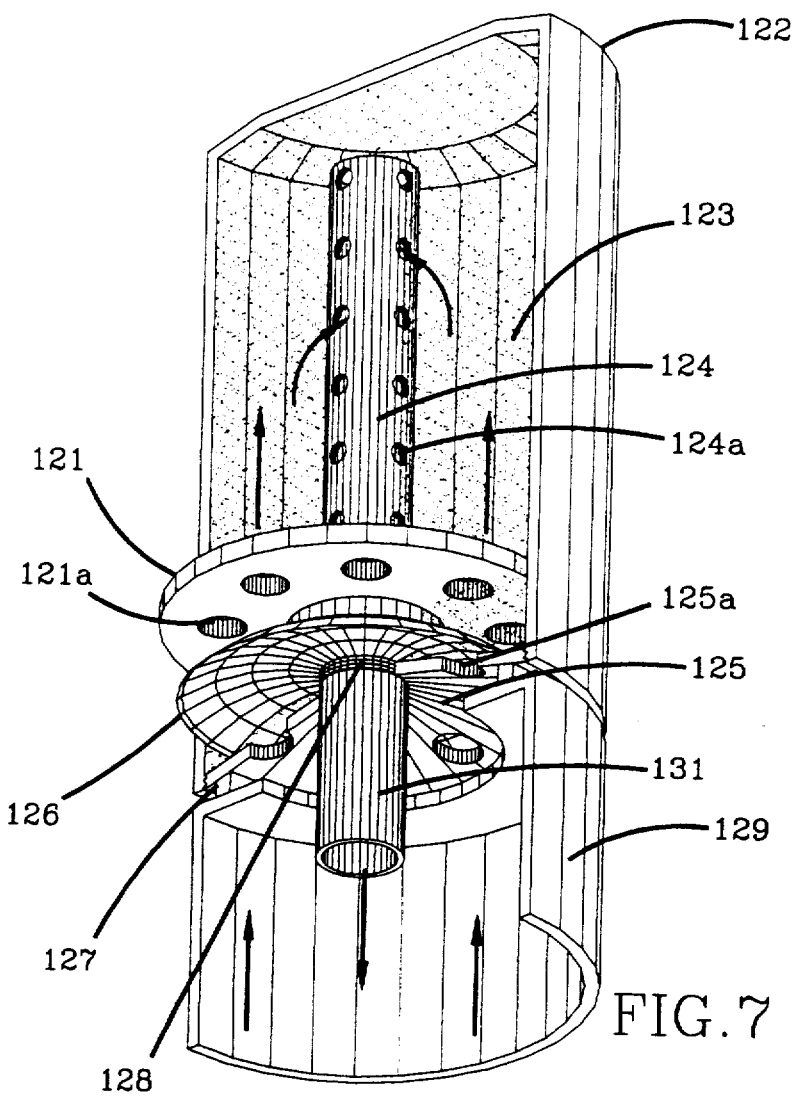
Figure 7A:
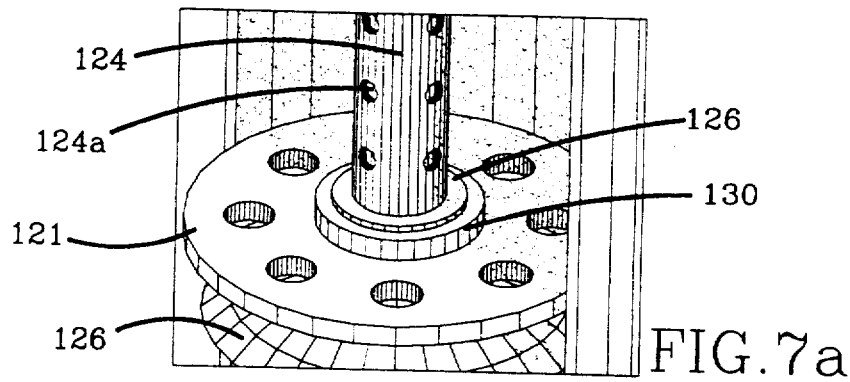
Figure 8:
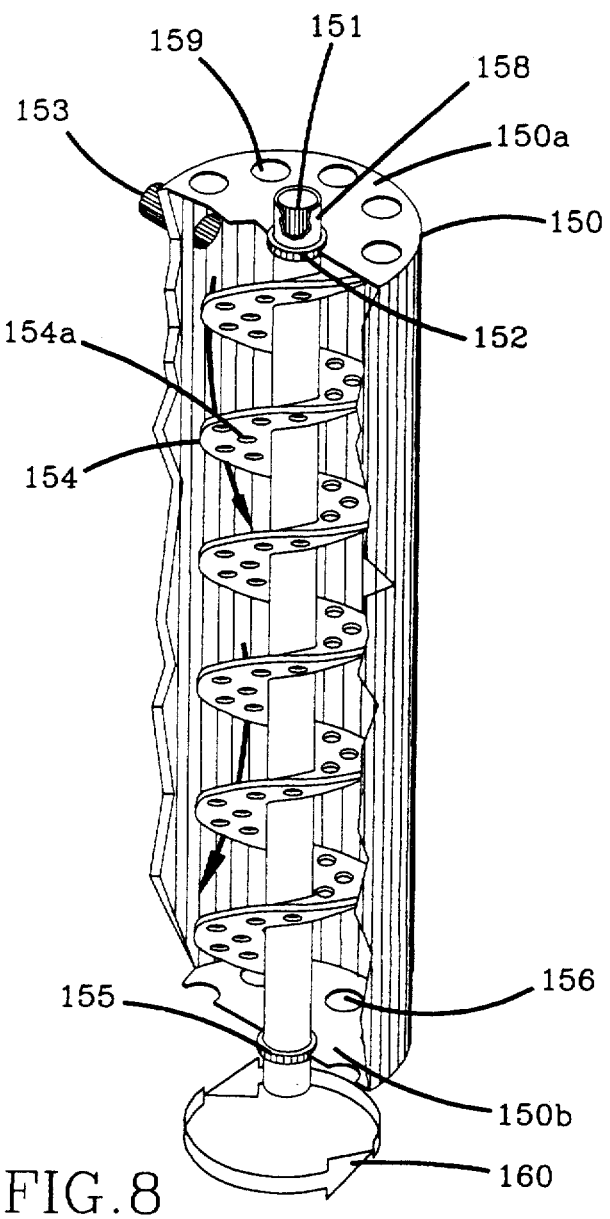
Figure 9:
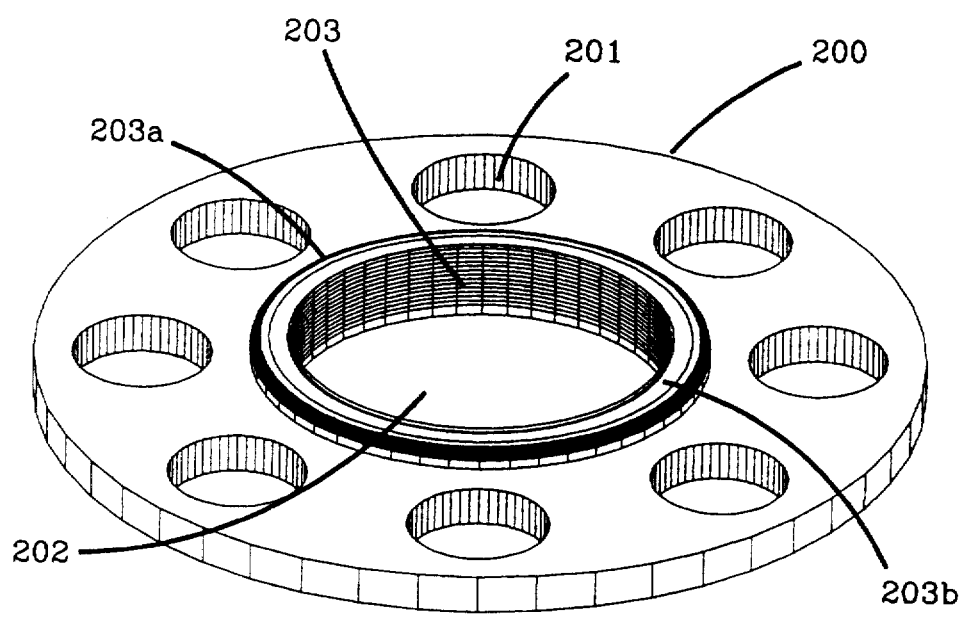
Figure 11:
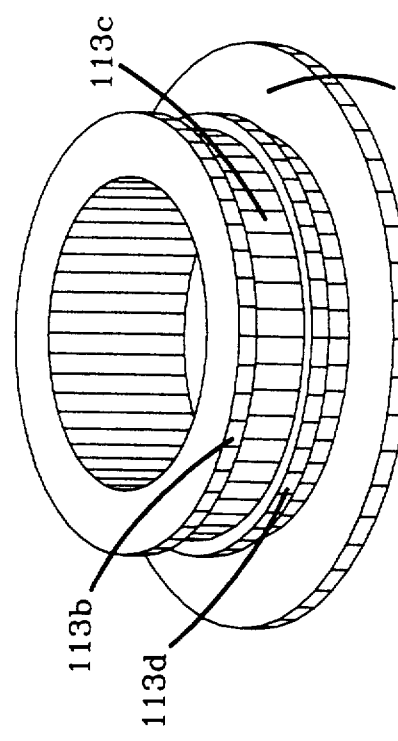
FIG. 11 is an enlarged view of a modified coupling ring.
Figure 10:
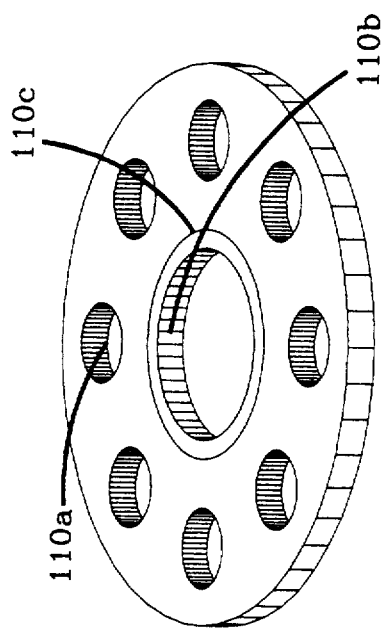
FIG. 10 is a view of a disc having a copper layer of the periphery of the disc opening.
Figure 12:
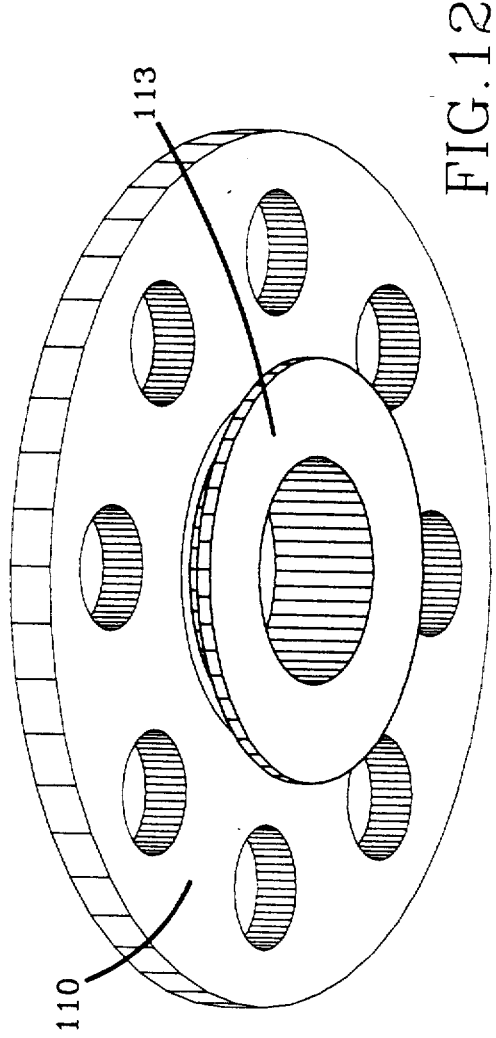
FIG. 12 is a view of the assembly of the discs and ring on discs 10 and 11.
Figure 13:
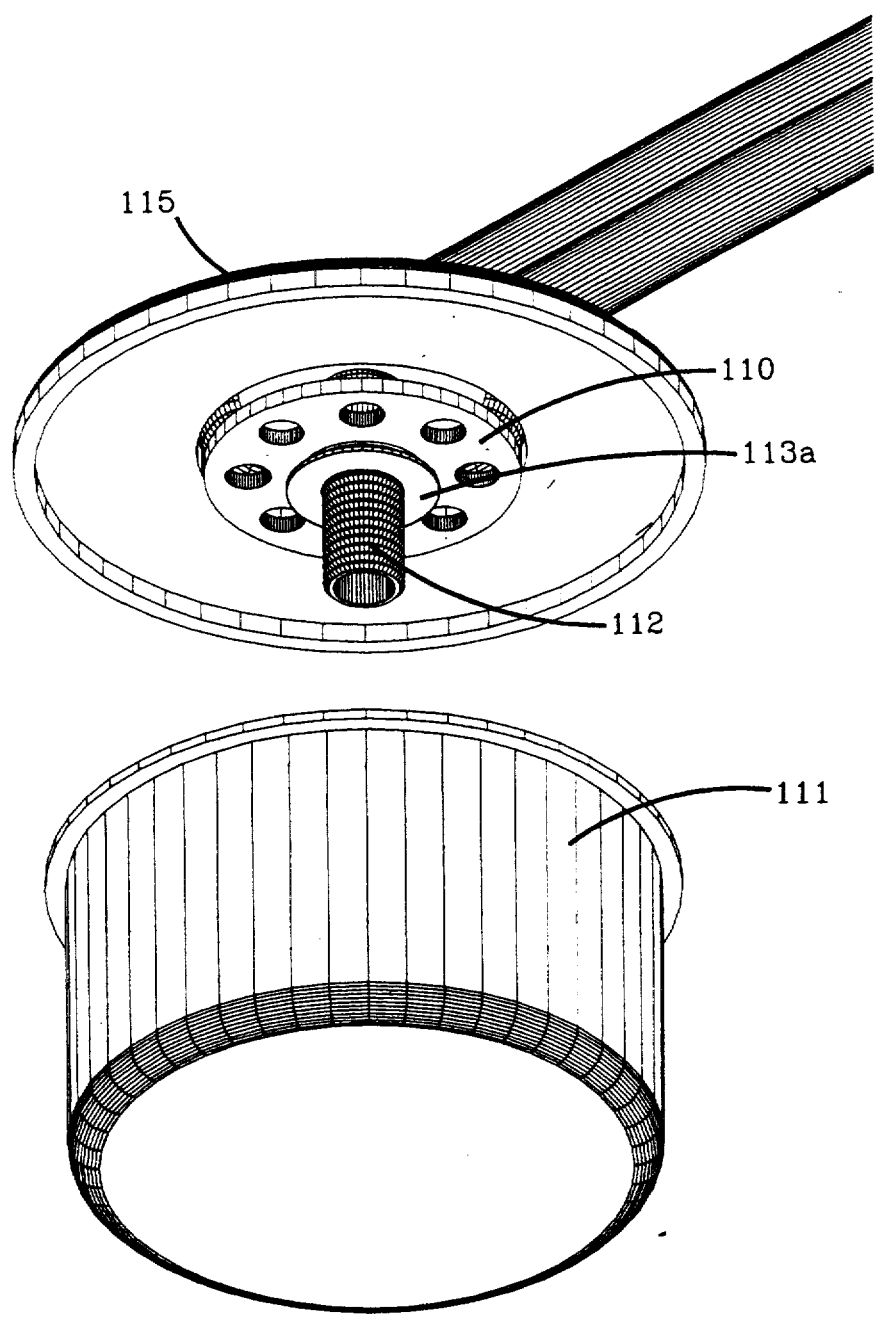

Example 9:

Referring now to the embodiment illustrated in FIGS. 10, 11, 12, and 13, the magnesium alloy disc 110 has a center opening 110c and large openings 110a. On the inner periphery of disc 110 is a thin layer of copper 110b which is in contact with the outer surface 113c of Teflon coupling ring 113. Contact surface 113c is bounded by lip portions 113b and 113d so as to provide a snug fit for the disc. At the end of the coupling ring is a grabbing lip 113a which enables a mechanic to easily remove the assembly of disc and coupling ring from the outlet pipe 112. As shown in FIG. 13 when a conventional oil filter 111 is removed from the upper portion 115 of the housing, it exposes the oil filter support pipe 112 and the assembly of the disc 110 and coupling ring 113. The assembly is readily removed from the pipe by manipulation of the grabbing lip 113a.

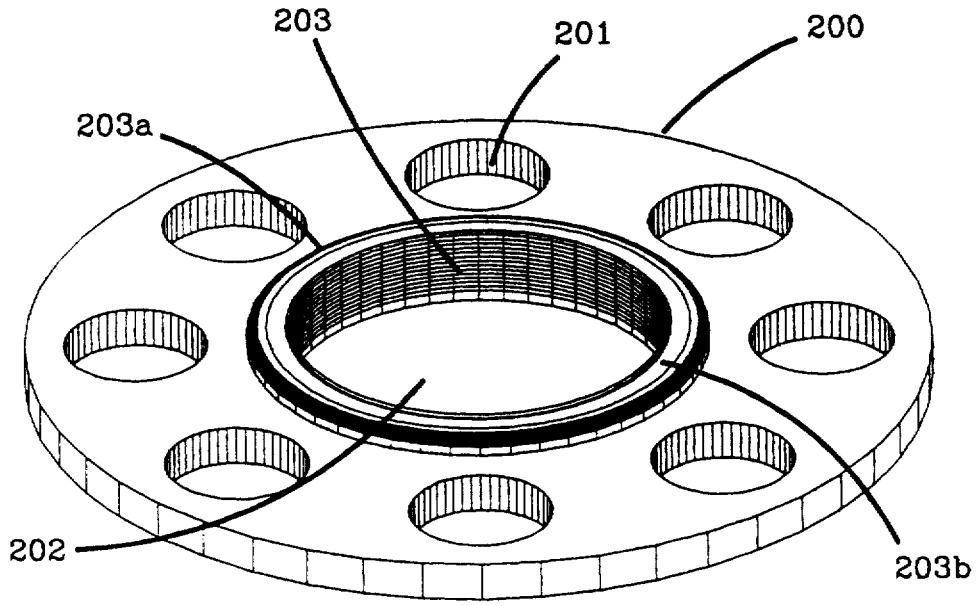

I claim:

1. A device for removing acidic impurities from an oil, comprising:

a solid body made of an acid-reactive material for contacting said oil, wherein said body includes a central opening;

a layer of copper or copper alloy in contact with an inner peripheral surface of said central opening;

a coupling ring formed of a high temperature resistant plastic material, said coupling ring having an exterior peripheral surface in contact with an inner peripheral surface of said layer of copper and a central opening for connection to a pipe or rod;

whereby acid impurities in the oil react with said acid-reactive material to form particulate materials that can removed by an oil filter.

2. The device of claim 1, wherein said acid-reactive material consists essentially of magnesium.

3. The device of claim 1, wherein said body is a circular disk, and said acid-reactive material consists essentially of magnesium.

4. The device of claim 1, wherein the central opening in said coupling ring is threaded for attachment to a pipe or rod having an exteriorly threaded surface.

* * * * *

UNITED STATES PATENT AND TRADEMARK OFFICE
CERTIFICATE OF CORRECTION

PATENT NO. : 5,500,093
DATED : March 19, 1996
INVENTOR(S) : Alan Marsden

It is certified that error appears in the above-identified patent and that said Letters Patent is hereby corrected as shown below:

The title page should be deleted to appear as per attached title page.

The drawing sheets consisting of Figs. 1-9 should be deleted to appear as per attached drawing Figs. 1-9.

Signed and Sealed this

Nineteenth Day of August, 1997

*Attest:*

BRUCE LEHMAN

*Attesting Officer*      *Commissioner of Patents and Trademarks*

United States Patent [19]

Marsden

[11] Patent Number: 5,500,093
[45] Date of Patent: Mar. 19, 1996

[54] OIL PURIFICATION

[76] Inventor: Alan Marsden, 272 NW. 79th Ter., Margate, Fla. 33063

[21] Appl. No.: 98,360
[22] PCT Filed: May 10, 1993
[86] PCT No.: PCT/US93/04533
§ 371 Date: Aug. 9, 1993
§ 102(e) Date: Aug. 9, 1993
[87] PCT Pub. No.: WO93/23507
PCT Pub. Date: Nov. 25, 1993

Related U.S. Application Data

[63] Continuation-in-part of Ser. No. 11,954, Feb. 1, 1993, abandoned, which is a continuation-in-part of Ser. No. 954,573, Sep. 30, 1992, abandoned, which is a continuation-in-part of Ser. No. 882,676, May 14, 1992, abandoned.

[51] Int. Cl.⁶ ............................................. C10G 19/073
[52] U.S. Cl. ................... 196/46; 196/46.1; 210/168; 210/206; 184/6.24
[58] Field of Search .................. 210/168, 206, 210/209, DIG. 17; 208/179, 189, 208 M; 184/6.24; 123/196 A; 196/46.1, 46; 422/222, 240, 211; 204/286, 297 R; 411/901

[56] References Cited

U.S. PATENT DOCUMENTS

| | | | |
|---|---|---|---|
| 2,884,133 | 4/1959 | Walulik et al. | 210/DIG. 17 |
| 2,983,384 | 5/1961 | Winslow | 210/223 |
| 3,279,607 | 10/1966 | Michaelson | 210/223 |
| 3,645,402 | 2/1972 | Alexander et al. | 210/266 |
| 4,014,794 | 3/1977 | Lewis | 210/206 |
| 4,417,855 | 11/1983 | Jepson | 416/244 A |

Primary Examiner—Matthew O. Savage
Attorney, Agent, or Firm—Joseph Zallen

[57] ABSTRACT

A lubricating oil purifying device adapted to be installed in the flow line of lubricating oil passing into an oil filter, comprising a solid body made of acid-reactive material and having a central orifice in which a coupling ring is positioned.

4 Claims, 9 Drawing Sheets